March 28, 1939.   A. B. INGRAM   2,151,918
AGRICULTURAL IMPLEMENT
Filed Dec. 14, 1936   2 Sheets—Sheet 1
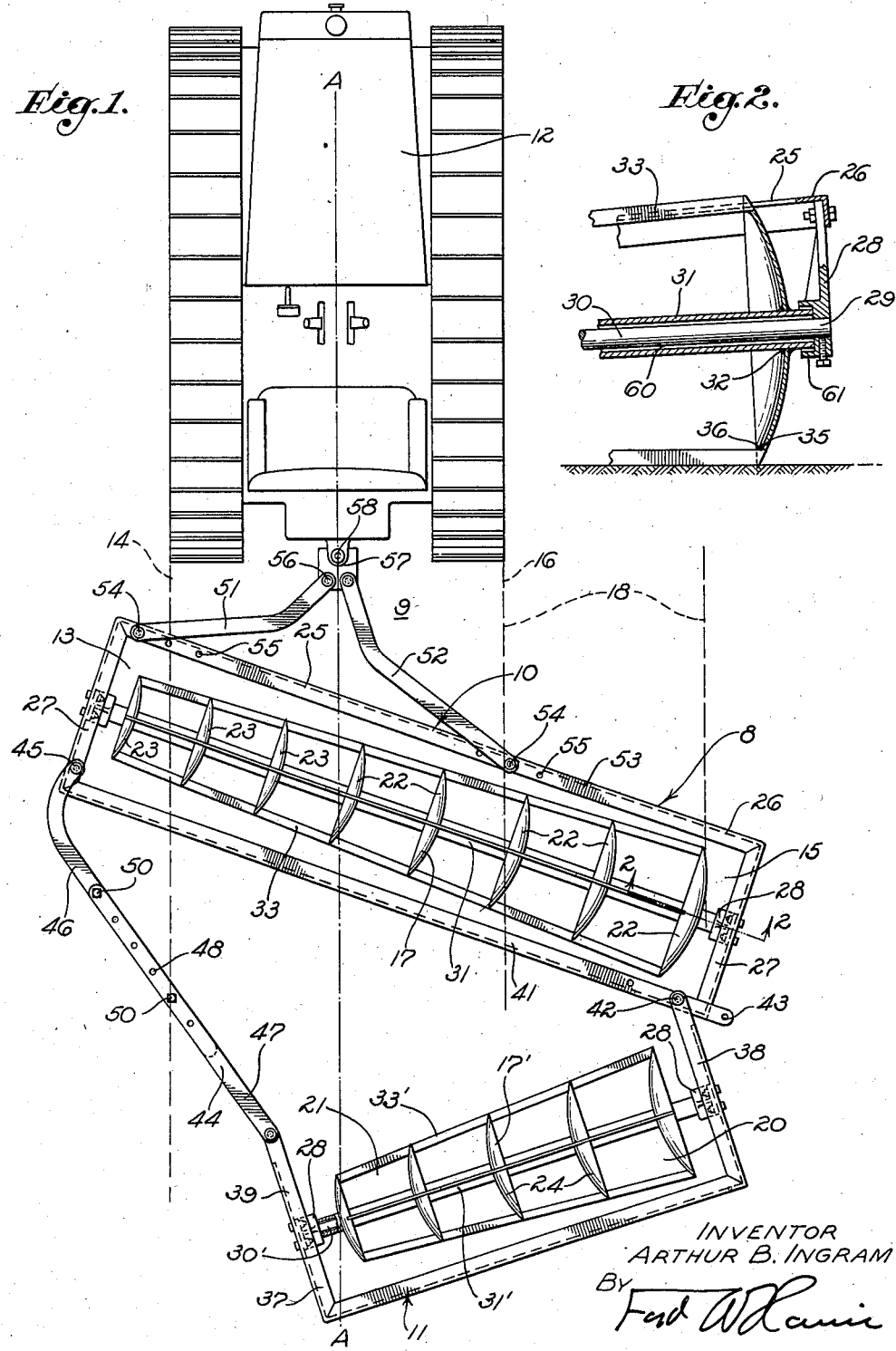
INVENTOR
ARTHUR B. INGRAM
ATTORNEY.

March 28, 1939.  A. B. INGRAM  2,151,918
AGRICULTURAL IMPLEMENT
Filed Dec. 14, 1936  2 Sheets-Sheet 2
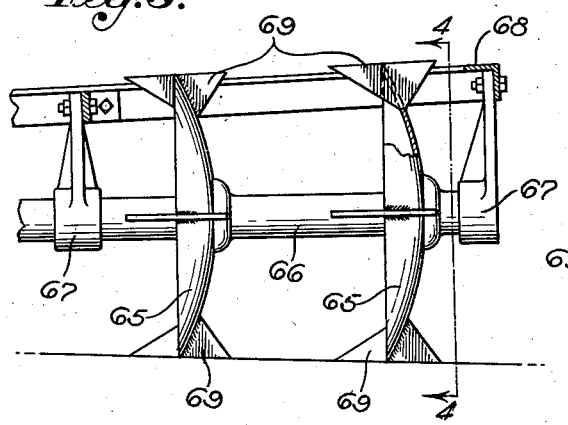
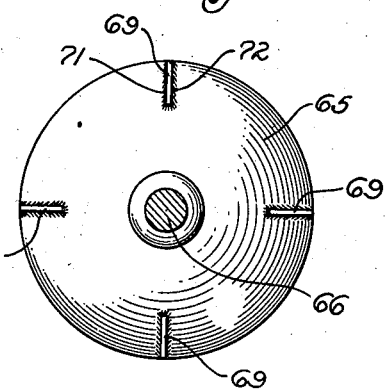
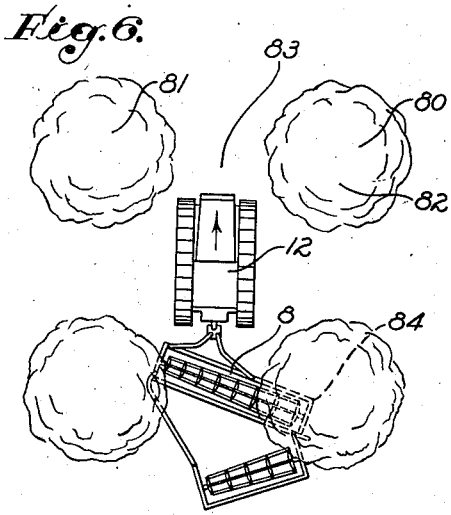
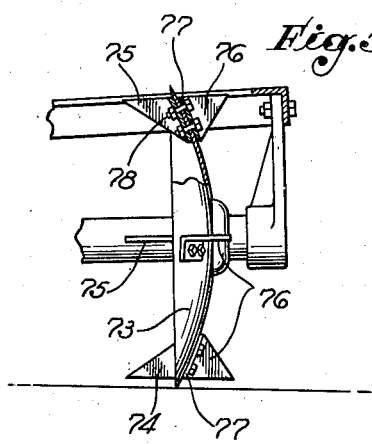
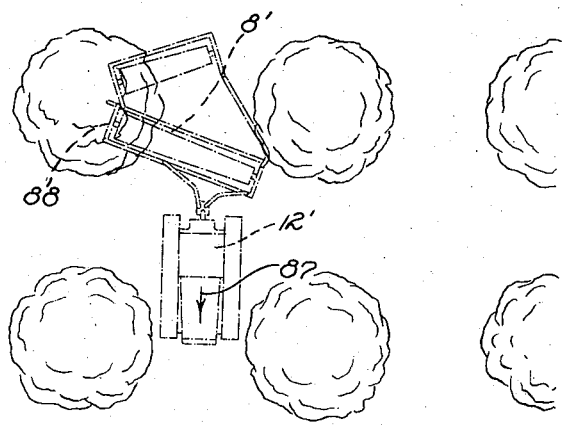
INVENTOR
ARTHUR B. INGRAM
BY
ATTORNEY.

Patented Mar. 28, 1939

2,151,918

UNITED STATES PATENT OFFICE 2,151,918

AGRICULTURAL IMPLEMENT

Arthur B. Ingram, Azusa, Calif.

Application December 14, 1936, Serial No. 115,828

15 Claims. (Cl. 55—83)

My invention relates to agricultural implements, and relates in particular to an improved disc harrow.

It is a well known fact that disc harrows of the ordinary type tend to move the soil laterally with the result that after a period of time a ridge of soil is formed between adjacent rows of trees of an orchard, and it is often found that this displacement of soil will expose the roots of trees or result in injury to the roots from the discs of the harrow, which discs penetrate through the thin soil covering the roots. It is an object of my present invention to provide a disc harrow of such form that two trips of the harrow through the lane between adjacent rows of trees, such trips being in opposite directions, will accomplish a double discing of all of the soil of the lane, and will cultivate this soil with a minimum of lateral soil displacement.

It is a further object of the invention to provide a disc harrow having cutter or chopper members secured to the discs near the peripheries thereof, which members enter the soil as the disc assemblies roll along, with the result that weeds or grass are not only chopped but are forced into or under the surface of the soil. Likewise, these chopping or cutting members improve the cultivating action in that the soil which is disced is better broken up, and likewise the tendency for the discs to dig in too deep and injure roots is avoided.

It is a further object of the invention to provide in a harrow of the above general character an assembly of discs mounted so as to rotate on a common axis, these discs being progressively increased in size from one end of the disc assembly to the other so that the disc assembly will be in the form of a truncated cone. The discs are tied together so as to rotate in unison, with the result that the larger discs tend to pull ahead of the smaller discs. The disc assembly of the above character is so mounted in the harrow structure that the large diameter end of the disc assembly will project laterally from the path of movement of the tractor, and the tendency for the large discs to roll ahead of the smaller discs is employed to assist in maintaining the offset relation of the harrow so that it will project under the limbs of trees when the tractor is moved centrally down a lane between adjacent rows of trees.

It is a further object of the invention to provide in a disc harrow construction a simple means for supporting a disc assembly so that it may freely rotate and without the need for a relatively large number of bearing brackets. In this preferred construction the supporting frame of a disc harrow section is provided with a pair of end members to which the ends of a stationary shaft are connected. The discs are mounted on a tube which rotates on the shaft, and means are provided at the ends of the tube for sealing the same so that grease may be held in the tube and dirt may be prevented from entering. This type of construction makes it possible to form the chopping or cutter members from continuous bars which extend the full length of the harrow section and are secured to the peripheral portions of the discs.

Further objects and advantages of the invention will be made evident throughout the following part of the specification.

Referring to the drawings, which are for illustrative purposes only,

Fig. 1 is a plan view showing a preferred form of my invention in operative relation to a tractor.

Fig. 2 is an enlarged fragmentary sectional view taken as indicated by the line 2—2 of Fig. 1.

Fig. 3 is an enlarged fragmentary sectional view showing an end portion of a harrow section in which an alternative type of chopper members are connected to the harrow discs.

Fig. 4 is a section taken as indicated by the line 4—4 of Fig. 3.

Fig. 5 is a fragmentary sectional view similar in character to Fig. 3 showing still another form of chopper member adapted to be bolted or riveted to the discs.

Fig. 6 is a plan view showing the manner in which the harrow accomplishes a double discing of the soil between adjacent rows of trees in an orchard by two trips in opposite directions.

In Fig. 1 I show a simple form of my new harrow 8 having a front section 10 and a rear section 11 connected to the front section in annular relation thereto as is customary in harrow construction. The front section 10 is nearly twice as long as the rear section 11 and is of such length relative to the path 9 of a motivating vehicle, such as a tractor 12, that one end 13 of the front section 10 will extend from one edge or side 14 of the path 9, across the path 9, and so that the opposite or rightward end 15 thereof will project a considerable distance beyond the rightward side 16 of the path 9. The front section 10 has a disc assembly 17 which will cultivate or disc the path 9 and also a strip 18 along one side of the path 9, which strip in the ordinary use of the harrow lies under the branches of the trees forming a row of trees along which the harrow is pulled by the tractor 12.

The rear section 11 has a disc assembly 17' of such length that the rightward portion 20 thereof will disc the strip 18 and the leftward portion 21 thereof will disc substantially half of the path 9.

In the operation of disc harrows it is found that although there are two sets of discs faced in opposite directions, there is a tendency to displace the soil toward the center of the aisle or lane formed between adjacent rows. In my new harrow construction the front section 10 is angled so that the projecting end 15 thereof lies to the rear of the end 13, which is opposite to the angle employed in harrows now commonly used. In other words, the types of harrows now employed have the rightward or projecting end of the front section disposed ahead of the inner end of the front section. Instead of the rearward section of such harrows being pivotally connected to the projecting end of the front section, it is pivotally connected to the inner end of the front section, or at least so that when the harrow is in operation the projecting or rightward end of the rearward section is spaced apart from the projecting end of the front section. In the applicant's construction the rear section 11 has its projecting or rightward end pivotally connected to the projecting end of the front section 10, and the rear section 11 slopes rearwardly so that the inner or rightward end of the rear section 11 lies behind or in trailing relation to the projecting end thereof. It will be noted that only discs 22 of the front section 10 are disposed so as to move soil toward the center line A—A of the path 9, but discs 23 of the front section 10 and discs 24 of the rear section 11 are disposed so as to move the soil away from the center line A—A; therefore, there are more discs operating to move soil toward the trees than to move soil toward the center of the lane.

The front section 10 comprises a supporting frame 25 which is preferably rectangular in shape and may be made from a structural angle 26 suitably bent so as to form corners. From the end bars 27 of the frame 25 end members or brackets 28 project downwardly and have the purpose of supporting the ends 29 of a shaft 30 which lies in a vertical plane coinciding with the longitudinal center line of the frame 25. On the shaft 30 a metal tube 31 is placed so as to rotate, and the discs 22 and 23 of the forward disc assembly 17 are secured in spaced relation along the tube 31 by suitable means such as welds 32. The discs 23 and 22 gradually increase in size from the leftward end 13 of the assembly 17 to the rightward or projecting end 15 thereof, and bars 33 are extended lengthwise of the disc assembly 17 and are preferably connected to the peripheral portions of the discs by being set into notches 35 formed in the peripheries of the discs and then secured in place by welding, as indicated at 36.

The rear section 11 comprises a supporting frame 37 having end bars 38 and 39, and to these end bars 38 and 39 brackets or end members 28 are secured in downwardly projecting relation to support a second shaft 30' on which a tube 31' is turnably mounted, such tube 31' supporting the discs 24 of the rear assembly 17'. These discs 24 of the rear disc assembly 17' are likewise progressively increased in diameter from the leftward end to the rightward end of the assembly, and bars 33' are secured to the peripheries thereof in the manner described relative to the bars 33 of the front disc assembly 17. The rightward end bar 38 of the frame 37 is adjustably pivoted to the rear bar 41 of the frame 25 by use of a bolt 42 which may be passed through a selected one of a number of openings 43 in the bar 41. The end bar 39 of the frame 37 is adjustably connected by means of an extensible link 44 with a pivot member 45 supported at the leftward end of the frame 25. The extensible link 44 comprises a pair of members 46 and 47 having openings 48 therein and adapted to be secured in overlapping relation by bolts 50. Draft means are provided for the harrow in the form of bars 51 and 52 which are connected to the front bar 53 of the front frame 25 by means of bolts 54 adapted to be passed through selected openings 55. The forward ends of the bars 51 and 52 are secured by means of bolts 56 to a draft plate 57 which may be connected by means of a pivot pin 58 to the tractor 12. The bars 51 and 52 curve forwardly intermediate the ends thereof so that the bars will clear the rearward portion of the tractor when the tractor is turned to the right or the left from its forward line of travel defined by the line A—A.

The bars 33 and 33' are flattened so as to have the character of blades and are placed so that the narrow edges thereof will be faced radially outwardly so that as the disc assemblies 17 and 17' roll forwardly, these bars or blades 33 and 33' will be forced into the ground with a chopping action and will likewise tend to force under the surface of the soil weeds and grass. The very thin annular spaces 60 between the respective tubes 31 and 31' and the shafts 30 and 30' therein are filled with a lubricant, and the ends of the tubes 31 and 31' are protected by annular walls 61 which project inwardly from the brackets 28 in telescoping relation to the ends of the tubes.

In Figs. 1 and 2 I show the manner in which the cutter or chopping members associated with the discs of a harrow are formed by continuous bars. Such construction is made possible by the manner of rotatably supporting the discs on a tube which in turn rotates on a shaft secured only at its ends. Accordingly, in the construction shown in Figs. 1 and 2 there is no need for intermediate brackets and bearings, with the result that the bars 33 and 33' may be extended the full length of the disc assemblies 17 and 17'.

In Fig. 3 I show discs 65 mounted on a shaft 66 carried in spaced bearing members 67 which project downwardly from a frame 68. These discs 65 have blade members 69 spaced around the peripheries thereof so as to occupy radial planes. The blades 69 are in the form of triangular plates which are set into radial notches 72 formed in the discs 65, as shown in Fig. 4, in which notches 72 the blades 69 are secured by welds 71.

In Fig. 5 I show a manner in which a disc 73, or any desired number thereof, may be equipped with cutter members 74 in the form of complementary triangular plates 75 and 76 having flanges 77 thereon through which bolts 78 may be passed to secure the members 75 and 76 to the disc 73. In this practice of the invention the cutter members 74 are set back a short distance within the periphery of the disc 73.

In Fig. 6 I schematically indicate adjacent rows 80 and 81 of trees 82 in an orchard, such adjacent rows 80 and 81 defining a lane or aisle 83 through which the tractor 12 is moving the harrow 8 of my invention in forward direction, the rightward or projecting part of the harrow passing under the limbs of the trees 82, as indicated by dotted lines 84. On its return trip through the lane 83, the tractor, indicated at 12' will be moving in the direction indicated by the arrow 87 which is opposite to the direction in which the tractor 12 moved through the lane 83 on its first trip. During the return trip of the harrow, it assumes the position in which it is indicated at 8', and the projecting portion thereof passes under the trees 81 as indicated by dotted lines 88.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a harrow of the character described, adapted to be pulled by a pulling device along a path of movement such as formed by a pulling device, the combination of: a front section of such length as to extend from one side of said path across said path and to project laterally beyond the other side of said path; means connecting said front section to said pulling device in the position indicated in the foregoing; and a rear section having one end thereof connected to the projecting end of said front section and being of such length that its other end will extend substantially to the center of said path, said front section having an assembly of discs disposed so as to rotate on a common axis, said discs gradually increasing in size toward the projecting end of said front section.

2. In a harrow of the character described, adapted to be pulled by a pulling device along a path of movement such as formed by a pulling device, the combination of: a front section of such length as to extend from one side of said path across said path and to project laterally beyond the other side of said path; means connecting said front section to said pulling device in the position indicated in the foregoing; and a rear section having one end thereof connected to the projecting end of said front section and being of such length that its other end will extend substantially to the center of said path, said rear section having an assembly of discs mounted so as to rotate on a common axis and gradually increasing in size toward one end of said rear section.

3. In a harrow of the character described, adapted to be pulled by a pulling device along a path of movement such as formed by a pulling device, the combination of: a front section of such length as to extend from one side of said path across said path and to project laterally beyond the other side of said path; means connecting said front section to said pulling device in the position indicated in the foregoing; and a rear section having one end thereof connected to the projecting end of said front section and being of such length that its other end will extend substantially to the center of said path, said sections each comprising an assembly of discs mounted so as to rotate on a common axis, the discs of each of said sections being gradually increased in diameter toward one end of the section comprising the same.

4. In a harrow of the character described, adapted to be pulled by a pulling device along a path of movement such as formed by a pulling device, the combination of: a front section of such length as to extend from one side of said path across said path and to project laterally beyond the other side of said path; means connecting said front section to said pulling device in the position indicated in the foregoing; and a rear section having one end thereof connected to the projecting end of said front section and being of such length that its other end will extend substantially to the center of said path, said sections each comprising an assembly of discs mounted so as to rotate on a common axis, the discs of each of said sections being gradually increased in diameter toward one end of the section comprising the same, and each assembly of discs carrying cutter members disposed near the peripheries of the discs and projecting laterally with respect to the faces of the discs, said cutter members being so placed as to enter the ground as said assemblies are rolled thereover.

5. In a harrow of the character described, adapted to be pulled by a pulling device along a path of movement such as formed by a pulling device, the combination of: a front section of such length as to extend from one side of said path across said path and to project laterally beyond the other side of said path; means connecting said front section to said pulling device in the position indicated in the foregoing; and a rear section having one end thereof connected to the projecting end of said front section and being of such length that its other end will extend substantially to the center of said path, said sections each comprising an assembly of discs mounted so as to rotate on a common axis, the discs of each of said sections being gradually increased in diameter toward one end of the section comprising the same, and each of said assemblies carrying a plurality of bars connected to the peripheries of said discs and extending lengthwise of the axis of rotation of said assemblies.

6. In a harrow of the character described, adapted to be pulled by a pulling device along a path of movement such as formed by a pulling device, the combination of: a front section of such length as to extend from one side of said path across said path and to project laterally beyond the other side of said path; means for connecting said front section to said pulling device in angular relation to the intended line of travel of the harrow and sloping rearwardly toward said projecting end thereof; and a rear section having one end thereof connected to the projecting end of said front section and in angular relation thereto, said rear section being of such length that its other end will extend substantially to the center of said path, said sections each comprising an assembly of discs mounted so as to rotate on a common axis, the discs of each of said sections being gradually increased in diameter toward one end of the section comprising the same, and each of said assemblies carrying a plurality of bars connected to the peripheries of said discs and extending lengthwise of the axis of rotation of said assemblies.

7. In a disc harrow, the combination of: a supporting frame having means for connecting it to a moving member so that it may be motivated; an assembly of discs connected to said frame so as to rotate on a common axis, the discs of said assembly being progressively increased in diameter from one end to the other of said assembly; and cutter members mounted on said discs near the peripheries thereof, said cutter members comprising blade elements projecting from said discs in the general direction of the axis of rotation of said discs.

8. In a disc harrow, the combination of: a supporting frame having means for connecting it to a moving member so that it may be motivated; an assembly of discs connected to said frame so as to rotate on a common axis, the discs of said assembly being progressively increased in diameter from one end to the other of said assembly; and cutter bars extending lengthwise of said assembly of discs, said bars being connected to said discs near the peripheries thereof and being adapted to enter the soil as said assembly of discs is rolled across the ground.

9. In a disc harrow, the combination of: a supporting frame having means for connecting it to a moving member so that it may be motivated; a gang of harrow discs including end discs and intermediate discs connected to said frame so as to rotate on a common axis; and cutter members mounted on said discs near the peripheries thereof to limit the soil-penetrating action of the discs, said cutter members comprising blade elements projecting from said discs in the general direction of the axis of rotation of said discs.

10. In a disc harrow, the combination of: a supporting frame having means for connecting it to a moving member so that it may be motivated; a gang of discs including end discs and intermediate discs connected to said frame so as to rotate on a common axis; and means to limit the soil-penetrating action of the gang of discs, said means comprising a series of bar-like members disposed longitudinally of the gang and extending across the spaces between the individual discs, said members being substantially equidistant from said common axis, said series of members being adapted to rotate about said axis.

11. In a disc harrow, the combination of: a supporting frame having means for connecting it to a moving member so that it may be motivated; a gang of discs including end discs and intermediate discs connected to said frame so as to rotate on a common axis; means to limit the soil-penetrating action of the gang of discs, said means comprising a series of bar-like members disposed longitudinally of the gang and extending across the spaces between the individual discs, said members being substantially equidistant from said common axis, said series of members being adapted to rotate about said axis; and means inside said series of members interconnecting adjacent discs of the gang to cause them to rotate in unison.

12. In a disc harrow, the combination of: a supporting frame having means for connecting it to a moving member so that it may be motivated; shaft means rotatably mounted in said frame; a plurality of discs mounted on and fixedly connected with said shaft whereby said discs rotate in unison with the shaft; and means to limit the soil-penetrating action of said discs, said means comprising a plurality of blade elements extending between adjacent discs in the general direction of said shaft means and adapted to rotate with the discs.

13. In a disc harrow, the combination of: a supporting frame having means for connecting it to a moving member so that it may be motivated; a rod mounted on said frame; a hollow shaft rotatably embracing said rod; a plurality of harrow discs nonrotatably mounted on said hollow shaft in spaced relation whereby the discs rotate in unison with said hollow shaft; and means to limit the soil-penetrating action of the discs, said means comprising blades interconnecting the discs near the peripheries thereof.

14. In a harrow of the character described, adapted to be pulled by a pulling device along a path of movement such as formed by a pulling device, the combination of: a front gang of discs disposed to shift soil laterally in one direction with respect to said path of movement, said front gang being of such length as to extend from one side of said path across said path and to project laterally beyond the other side of said path; means connecting said front gang to said pulling device in the position indicated in the foregoing; and a rear gang of discs disposed to shift soil laterally in the opposite direction, said rear gang of discs having one end thereof connected to the projecting end of said front gang of discs and being of such length that its other end will extend substantially to the center of said path.

15. In a harrow of the character described, the combination of: a harrow section with concave discs, the concavity of the discs being in one lateral direction with respect to the harrow; a second harrow section with concave discs, the concavity of said second discs being in the opposite lateral direction from the concavity of the first-mentioned discs; means connecting said sections together in angular relation with an end of one of said sections adjacent an end of the other of said sections, one of said sections being approximately one-half the length of the other of said sections; and draft means extending forwardly from one of said sections and being so formed as to connect the same to a pulling vehicle in angular relation thereto.

ARTHUR B. INGRAM.